United States Patent [19]

King et al.

[11] 4,395,251
[45] Jul. 26, 1983

[54] TENSIONING DEVICES

[75] Inventors: Alan G. King, Biggleswade; Keith Hunt, Meppershall, both of England

[73] Assignee: Borg-Warner Limited, Letchworth, England

[21] Appl. No.: 229,969

[22] Filed: Jan. 30, 1981

[30] Foreign Application Priority Data

Feb. 11, 1980 [GB] United Kingdom ............... 8004449

[51] Int. Cl.³ ..................... G05G 5/06; F16H 7/08
[52] U.S. Cl. .................................. 474/111; 474/140; 474/135; 74/531
[58] Field of Search ............... 474/111, 140, 135; 188/67; 74/531

[56] References Cited

U.S. PATENT DOCUMENTS 2,174,321 9/1939 Gunn .................................. 188/67
3,830,114 8/1974 Daines ............................... 474/111

FOREIGN PATENT DOCUMENTS 2300396 7/1973 Fed. Rep. of Germany ...... 474/111
1457476 11/1966 France .............................. 474/111
 323959 1/1930 United Kingdom ............... 474/111
1190366 5/1970 United Kingdom ............... 474/111
1518887 7/1978 United Kingdom ............... 474/111

Primary Examiner—Kenneth Dorner
Assistant Examiner—D. Wright
Attorney, Agent, or Firm—Aubrey L. Burgess

[57] ABSTRACT

A chain tensioning device comprises a pair of arms 2, 3 which are pivoted together and urged apart so that the arm 3 applies a tensioning force to a chain by means of a spring loaded cam block 5. A catch disc 9 and rod 8 arrangement is provided to prevent return movement of the spring loaded block and hence collapse of the arm 3 under load reversals of the chain.

12 Claims, 6 Drawing Figures

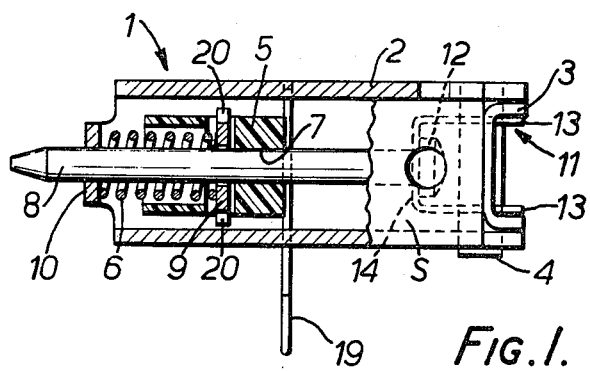
FIG.1.
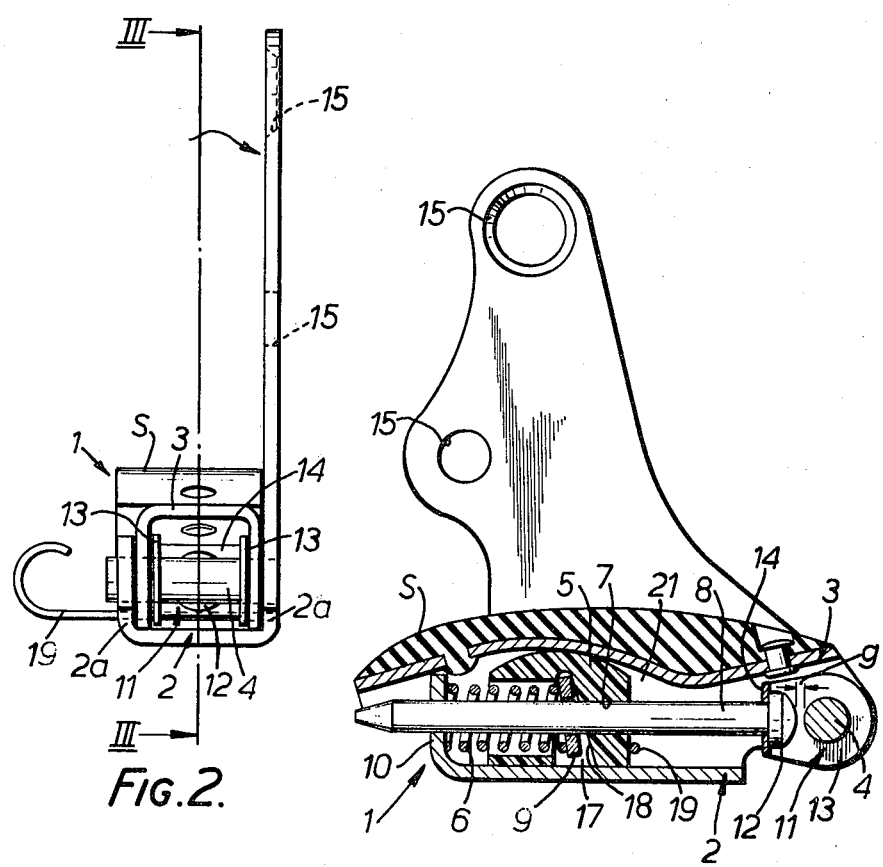
FIG.2.
FIG.3.

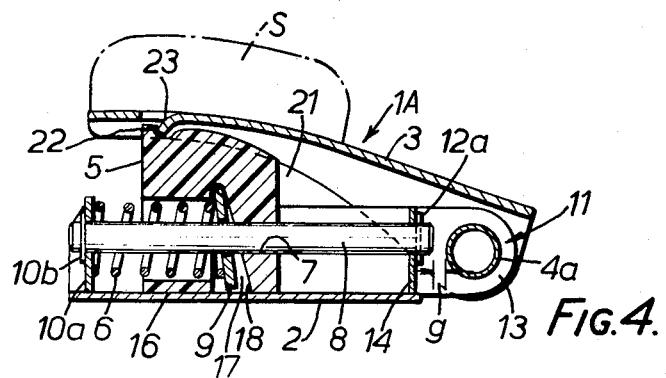
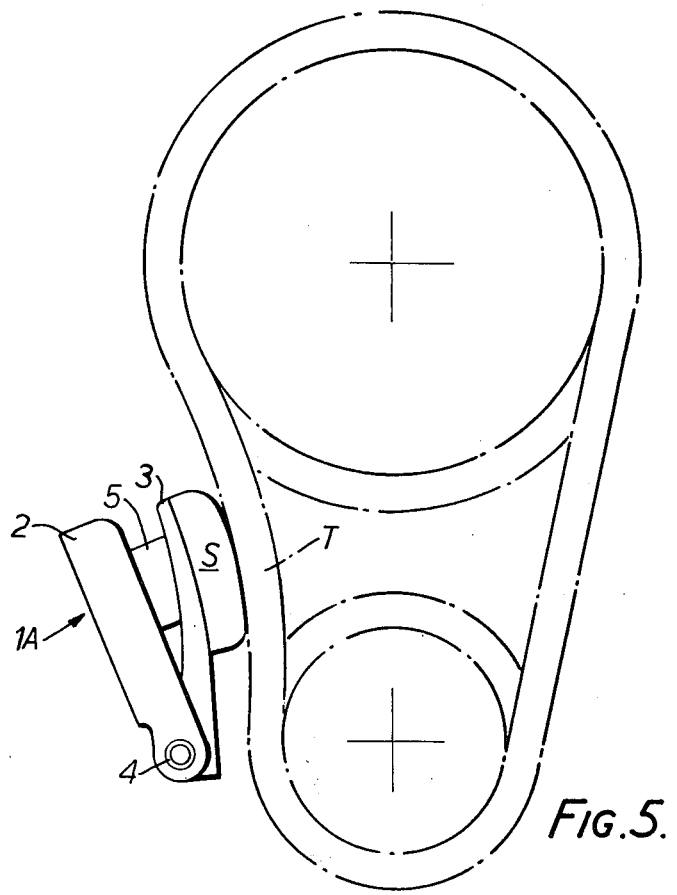

TENSIONING DEVICES

This invention relates to tensioning devices for endless driving elements such as chains and belts.

A preferred tensioning device constructed in accordance with the invention (whose scope is defined in the appended claims) comprises a pivoted arm, an actuator slidably mounted on a rod, spring means biassing said actuator in one direction along said rod, said arm being caused to pivot in a tensioning sense in response to spring biased movement of said actuator in said one direction, and a catch disc mounted on said rod and tiltable into binding engagement therewith in response to return movement of said actuator against said spring bias along said rod, as would be caused upon return pivotal movement of said arm, by which to inhibit such return movement of said actuator and hence said return pivotal movement of said arm.

The actuator may take the form of a cam block which is urged by a compression spring in a direction such as to exert a wedge action upon the pivoted arm.

In order that the invention may be well understood there will now be described two embodiments of the preferred tensioning device, which are griven by way of example of the invention, with reference to the accompanying drawings, in which:

FIG. 1 is a part sectioned plan view of the first embodiment of tensioning device;

FIG. 2 is an end elevation of the same tensioning device;

FIG. 3 is a side elevation section on the line II—II of FIG. 2;

FIG. 4 is a sectioned side elevation of the second embodiment of tensioning device;

FIG. 5 is a side elevation of the second tensioning device directly tensioning a chain drive.

Figure 6:
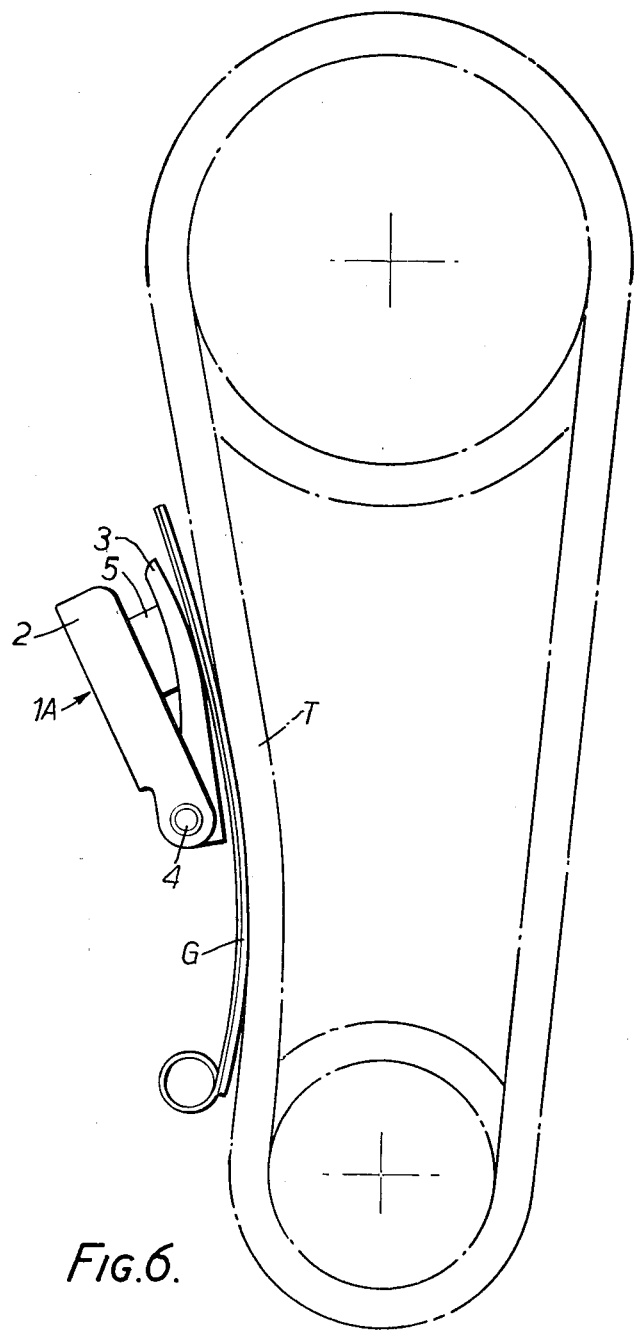
FIG. 6 is a side elevation of the second tensioning device modified to indirectly tension a chain drive.

As shown in FIGS. 1 to 3, a tensioning device 1 has a pair of generally channel-shaped lower 2 and upper 3 arms which are pivoted together at one end as by means of a pivot pin 4.

The arms 2 and 3 are pivoted apart by a cam block 5 which is mounted to slide longitudinally of the lower arm 2 and is urged by a compression spring 6 towards the pivotally interconnected ends of the arms.

The cam block 5 is apertured at 7 and is mounted at that aperture on a guide rod 8 which extends longitudinally of the lower arm 2. The compression spring 6 is mounted about the guide rod 8 and enters the cam block 5 to seat at its inner end against a catch disc 9 also mounted on that rod. Thereby, the spring 6 applies a biasing force through the catch disc 9 to the cam block 5.

The outer end of the spring 6 seats against a support flange or abutment member 10 which is integral with the lower arm 2 and which slidably supports an outer end of the guide rod 8. The guide rod 8 at its inner end is slidably mounted in an axially immovable arm member 11 and has an enlarged head 12 by which to be prevented from withdrawal therefrom. The arm member 11 is fashioned as a channel bracket with its flanges 13 pivotally mounted about the pivot pin 4 and its web 14 receiving the guide rod 8.

If the tensioning device 1 is to be used to tension the timing chain of an engine, the lower arm 2 would be secured at its mounting apertures 15 in relation to the chain drive and the engine as may be convenient. The upper arm 3 would then be pivoted away from the lower arm 2 under the wedging action of the spring biased cam block 5. The upper arm 3 carries a shoe S rivetted to it and which directly engages the timing chain thereby to tension it.

With the aforesaid construction, the wedging action of the cam block 5 would be smooth and progressive, the block being free to slide along the guide rod 8, under the bias applied by the compression spring 6 through the catch disc 9, and also being guided by the base of the cam block 5 engaging and sliding along the base plate 16 of the lower arm 2. The compression spring 6 is at least partially supported in an opening, in the cam block 5.

The tensioning device 1 provides resistance to load reversals in the chain. Upon such a condition obtaining, return movement of the cam block 5 against the bias of the compression spring 6 and subsequent collapse of the upper pivoted arm 3 is prevented by the catch disc 9 which binds on the guide rod 8. At that time, the cam block 5, catch disc 9 and guide rod 8 can only move as one, and the abutment of the guide rod head 12 with the web 14 of the arm member 11 determines the extent by which the guide rod and hence the cam block can move rearwardly.

It should be noted that when the catch disc 9 is perpendicular with respect to the guide rod 8, it does not bind against the guide rod and relative longitudinal movement between the two can take place. That condition obtains when the cam block 5 is being biased forwardly, by the compression spring 6 acting through the catch disc 9, to wedge open the upper arm 3. It is when the catch disc 9 is tilted relative to the guide rod 8 that it will bind against it, and that condition is ensured by the catch disc being located in a recess 17 in the cam block 5, the recess having an angled front face 18. Accordingly, upon the cam block 5 tending to rearwardly move along the guide rod 8, its angled recess face 18 will tilt the catch disc 9 into binding engagement with the guide rod. The opening in the cam block 5 in which the spring 6 is at least partially supported as in a wall of the cam block 5 opposite the angled face 18.

To prevent overloading of the chain T, a degree of lost motion is provided in the tensioning device 1 by the guide rod 8 being free to slide in the web 14 of the arm member 11 to a predetermined limited extent which is governed by the gap g between the head 12 of the guide rod and the pivot pin upon which the arm 3 pivots. Thus, although the cam block 5 and the catch disc 9 are free to slide along the guide rod 8 when they are being urged forwardly by the compression spring 6, there will be by frictional drag a tendency for the guide rod 8 also to move forwardly and slide within the bracket web 14 by the length of the gap g at which time the head 12 of the guide rod will abut the pivot pin 4, and the guide rod prevented from moving further inwardly. Accordingly, in the event of a load reversal condition obtaining, so causing the cam block 5 to move rearwardly and hence bind the then tilted catch disc 9 against the guide rod 8, since the guide rod 8 has previously been moved forwardly and hence its head 12 moved away from the bracket web 14, there is scope for rearward movement of the guide rod until its head 12 against abuts the web 14. The head 12 acts as a stop means for the guide rod 8 in both directions of its movement. Therefore, although the cam block 5, catch disc 9 and guide rod 8 can only be moved rearwardly as one, they can do so within the limit imposed by the size of the gap g.

As will be realized, by suitable adaption of the construction, the size of the gap g can be varied, and hence the degree of lost motion available to the guide rod 8 likewise varied, as may be required in accordance with the operating characteristics of the engine to which the tensioning device is to be fitted.

The tensioning device may be locked in its spring loaded condition for shipping purposes and unlocked after installation. For this purpose, a locking pin 19 is releasably inserted in apertured webs 2a of the arm 2 across the path of movement of the spring loaded cam block 5. The pin 19 would probably also be used when the tensioning device is to be removed for repair or replacement.

The catch disc 9 is provided with a pair of oppositely extending radial lugs 20 which, as shown in FIG. 1, project outwardly of the cam block 5. To release the tensioning device 1 from its locked spring loaded condition shown in FIG. 3, it is sufficient to insert a screwdriver (not shown) into the space 21 between the lower 2 and upper 3 arms and then twist the screwdriver in a clockwise sense as viewed in that Figure. To lock the tensioning device 1 in its spring loaded condition, a pulling force is applied by a suitable tool to the exposed lugs 20 so as to straighten the catch disc and pull the cam block 5 back against the bias of the compression spring 6, and the locking pin 19 inserted in the lower arm 2.

The upper and lower arms are preferably steel pressings. The cam block is preferably of a suitable synthetic plastics material. The guide rod and the catch disc would suitably be of metal and would be hardened to resist wear.

The alternative tensioning device 1A of FIG. 4 has functionally similar parts to the tensioning device 1 which are indicated by like references and will only be described in relation to constructional differences of note.

One such difference is that the outer end of the spring 6 seats against a support plate or abutment member 10a which is slidably mounted on the base plate 16 of the lower arm and which is also slidably mounted upon the guide rod 8 and held thereon against the bias of the spring by a clip retainer 10b. Instead of the inner end of the guide rod having an enlarged head, another clip retainer 12a is provided to determine the extent of rearward movement of the rod, the outer end face of the rod when engaging the arm pivot restricting forward movement. Further, a bush 4a is utilized instead of a pivot pin, and a standard bolt (not shown) would be passed through the bush and secured by a nut to hold the arms 2 and 3 and arm member 11 together.

The tensioning device 1A may also be locked in its spring loaded condition. To this end, the top of the cam block 5 is notched at 22, and the upper arm 3 is provided with a depending lug 23. When the lug 23 is engaged in the notch 22, the bias of the compression spring 6 acting on the cam block 5 will angularly lock the upper arm 3 relative to the lower arm 2, as shown in FIG. 4. Therefore, it is the spring loading itself which is used to lock the alternative tensioning device in its spring loaded condition.

The shoe S of the tensioning device could be of rubber and directly moulded upon the upper arm 3. As can be seen from FIG. 5, the shoe S directly engages the timing chain T thereby to tension it. Alternatively, as shown in FIG. 6, the shoe could be omitted, and the upper arm 3 used to indirectly apply a tensioning force to the timing chain T by engaging a pivoted guide strip G which itself engages the chain, as is suitable for a long centre distance chain drive.

The tensioning device 1 could, of course, be functionally used, adapted as necessary, in the manner shown in FIGS. 5 and 6.

We claim:

1. A tensioning device for an endless driving element, comprising a rod, a pivotal arm, an actuator slidably mounted on said rod, compression spring means biasing said actuator in one direction along said rod, said arm being caused to pivot in a tensioning sense in response to spring biased movement of said actuator in said one direction, a catch disc mounted on said rod and tiltable into binding engagement therewith in response to return movement of said actuator against said spring bias along said rod, as would be caused upon return pivotal movement of said arm, by which to inhibit said return movement of said actuator and hence said return pivotal movement of said arm, and means carried by said pivoted arm to engage said endless driving element.

2. A tensioning device as claimed in claim 1, including means permitting a limited extent of axial movement of said rod by which to permit a limited extent of return movement of said actuator when said catch disc is tilted into binding engagement with said rod and hence permit a limited degree of return pivotal movement of said arm.

3. A tensioning device as claimed in claim 2, wherein said actuator is in the form of a cam block which when biased by said spring means in said one direction exerts a wedging action upon said pivoted arm by which to pivot said arm in said tensioning sense.

4. A tensioning device as claimed in claim 4, wherein said actuator has an angled face adjacent said catch disc such as to effect said tilting of said catch disc into said binding engagement with said rod in response to said return movement of said actuator.

5. A tensioning device as claimed in claim 5, wherein said catch disc is positioned in a recess on said actuator, said recess being defined by a pair of walls, said angled face defining one of said walls of said recess, said compression spring extending through the other wall of said recess to impart its spring bias direct to said catch disc and thence to said actuator.

6. A tensioning device as claimed in claim 5, including an arm member mounted on a pivot pin and slidably supporting an inner end of said rod, said rod having stop means thereon and cooperating with said pivot pin and said arm member by which together therewith to constitute said rod limiting movement means to permit said limited extent of axial movement of said rod.

7. A tensioning device as claimed in claim 6, wherein said pivoted arm is also mounted on said pivot pin by which to be pivotable in said tensioning and return senses.

8. A tensioning device as claimed in claim 7, including a second arm having means by which to mount said tensioning device to a support, said second arm also being mounted on said pivot pin, said cam block being supported on said second arm when exerting its said wedging action on said pivoted arm.

9. A tensioning device as claimed in claim 8, including an abutment member integral with said second arm and against which said spring means reacts when imparting its bias to said actuator, said abutment member slidably supporting an outer end of said rod.

10. A tensioning device as claimed in claim 8, including an abutment member slidably supported on said second arm and itself slidably supporting an outer end of said rod, said spring means reacting against said abutment member when imparting its bias to said actuator.

11. A tensioning device as claimed in claim 9, including releasable locking means for locking said pivoted arm in its spring loaded condition, said locking means comprising a pin releasably positioned in said second arm across the path of spring biased movement of said actuator.

12. A tensioning device as claimed in claim 11, including lug means on said catch disc and located for engagement by a tool by which said catch disc may be straightened from its tilted attitude to permit said return pivotal movement of said arm.

* * * * *

UNITED STATES PATENT AND TRADEMARK OFFICE
CERTIFICATE OF CORRECTION

PATENT NO. : 4,395,251
DATED : July 26, 1983
INVENTOR(S) : Alan G. King and Keith Hunt It is certified that error appears in the above—identified patent and that said Letters Patent is hereby corrected as shown below:

Column 4, line 34, cancel "claim 4" and insert -- claim 3 --.

Column 4, line 39, cancel "claim 5" and insert -- claim 4 --.

Signed and Sealed this

Fourth Day of October 1983

[SEAL]

Attest:

GERALD J. MOSSINGHOFF

Attesting Officer    Commissioner of Patents and Trademarks